United States Patent

[11] 3,624,047

| [72] | Inventors | Yasuhiro Ogawa<br>Suita;<br>Norio Awata, Settsu, both of Japan |
|---|---|---|
| [21] | Appl. No. | 887,780 |
| [22] | Filed | Dec. 23, 1969 |
| [45] | Patented | Nov. 30, 1971 |
| [73] | Assignee | Kanegafuchi Boseki Kabushiki Kaisha<br>Tokyo, Japan |
| [32] | Priority | Dec. 26, 1968 |
| [33] | | Japan |
| [31] | | 43/96225 |

[54] PRODUCTION OF α,α-DISUBSTITUTED β-PROPIOLACTONE POLYMERS WITH CONTROLLED MOLECULAR WEIGHT
5 Claims, No Drawings

[52] U.S. Cl. .................................................. 260/78.3

[51] Int. Cl. ....................................................C08g 17/017
[50] Field of Search ............................................ 260/78.3, 473 A, 484 A

[56] References Cited
UNITED STATES PATENTS

| 3,407,181 | 10/1968 | Kierstead ...................... | 260/78.3 |
| 3,471,456 | 10/1969 | Klootwijk ...................... | 260/78.3 |

*Primary Examiner*—William H. Short
*Assistant Examiner*—E. Nielsen
*Attorney*—Wenderoth, Lind & Ponack ABSTRACT: The molecular weight distribution of poly(beta-lactones) is controlled by polymerizing the lactones in the presence of an anionic initiator and allyl halides or benzyl halides.

PRODUCTION OF α,α-DISUBSTITUTED β-PROPIOLACTONE POLYMERS WITH CONTROLLED MOLECULAR WEIGHT

This invention relates to the production of poly-α,α-disubstituted-β-propiolactones and more particularly to an improvement in the production of poly-α,α-disubstituted-β-propiolactones with a controlled molecular weight by using a particular molecular weight controlling agent.

It is known to polymerize pivalolactone in the presence of an acid or anionic catalyst. For example, in British Pat. No. 766,347, there is disclosed a method wherein pivalolactone is polymerized in the presence of an acid, inorganic base, tertiary amine, Friedel-Craft catalyst, carboxylate, phenoxide or quaternary ammonium compound as a polymerization catalyst.

However, in the polymerization of pivalolactone, it is difficult to control the polymerization rate or velocity and the molecular weight of the resulting polymer. Particularly a process for producing a polymer of a desired molecular weight in a system having a proper polymerization velocity has not yet been developed.

As is known, the molecular weight of a polymer is related with various physical properties of the polymer such as, for example, the toughness and melt viscosity. Therefore, depending on the particular uses of the polymer, various molecular weights are required. For example, a polymer to be used for injection molding is required to be of a low-melt viscosity while a polymer to be used for forming films is required to have a high-melt viscosity. Thus, polymers for producing industrial products are required have various molecular weights.

However, in the known method of polymerizing α,α-disubstituted-β-propiolactones, it is difficult to readily produce a polymer of a desired polymerization degree. It is also difficult to obtain a monomer of a predetermined purity, the purity having a great influence on the polymerization degree. Therefore, it is difficult to obtain a polymer of a predetermined polymerization degree with good reproducibility.

It has been proposed to control the molecular weight of a pivalolactone polymer by varying the amount of the polymerization catalyst. However, if the amount of the catalyst is reduced to increase the molecular weight, the polymerizing reaction velocity reduces at the same time so that the time required for the reaction is unduly increased. It is also known to add a molecular weight controlling agent is to a polymerization system. However, if such known molecular weight controlling agent (i.e. acid halide, thiophenol, mercaptan or ethanolatable compound) is added to the polymerization system, the reaction velocity becomes low. Further the reproductivity of the molecular weight control is also poor.

Therefore, a principal object of the present invention is to provide an improved method for producing poly α,α-disubstituted-β-propiolactone having with a controlled molecular weight.

Another object of the present invention is to industrially easily produce a polypivalolactone which is useful as a raw material for forming fibers, films and other shaped articles.

Other objects of the invention will be apparent from the following description.

Briefly, these objects of this invention are accomplished, according to the invention, by a method of ring-opening polymerizing an α,α-disubstituted-β-propiolactone of the formula:

(I)

wherein each of $R_1$ and $R_2$ is an alkyl group of one to four carbon atoms or aryl group, in the presence of an anionic catalyst, characterized by the fact that there is added to the ring-opening polymerization system at least one molecular weight controlling agent selected from the group consisting of halogenated unsaturated hydrocarbon represented by the general formula:

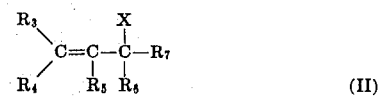
(II)

wherein each of $R_3$, $R_4$, $R_5$, $R_6$ and $R_7$ represents hydrogen, a halogen atom, alkyl group of one to six carbon atoms, aryl group or halogenated alkyl group of one to six carbon atoms and x represents a halogen atom, and halogenated aromatic hydrocarbons represented by the general formula:

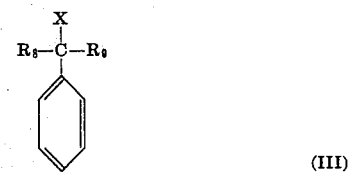
(III)

wherein X represents a halogen atom and each of $R_8$ and $R_9$ represents hydrogen, halogen atom, alkyl group of one to six carbon atoms or halogenated alkyl group of one to six carbon atoms.

We have found that when the molecular weight controlling agent of the formula (II) or (III) is used it is possible, in the ring-opening polymerization of an α,α-disubstituted-β-propiolactone of the formula (I) in the presence of an anionic catalyst, to readily control the molecular weight of the resulting polymer as desired, without affecting the reaction velocity and regardless of the purity of the monomer employed in the polymerization.

Examples of halogenated unsaturated hydrocarbons of the above general formula (II) are 3-chloro-1-propene, 3-bromo-1-propene, 3-iodo-1-propene, 3-fluoro-1-propene, 1,3-dichloro-1-propene, 2,3-dibromo-1-propene, 1,2,3-trichloro-1-propene, 3-chloro-2-methyl-1-propene, 1,3-dichloro-2-methyl-1-propene, 1,3-dibromo-2-methyl-1-propene, 3-chloro-2-chloromethyl-1propene, 1-bromo-2-butene, 1-chloro-2-butene, 1,3-dichloro-2-butene, 1,3-dichloro-2-methyl-1-propene, 1,1,3-trichloro-2-methyl-1-propene, 1,3,3-trichloro-2-methyl-1-propene 1,3-dichloro-2-chloromethyl-1-propene, 3,3,3-trichloro-2-methyl-1-propene, 3,3-dichloro-2-chloromethyl-1-propene, 1-chloro-3-methyl-2-butene, 1-chloro-2,3-dimethyl-2-butene, 1-chloro-3-phenyl-2-propene, 1-chloro-2-hexane and 1-chloro-2-octene.

The halogenated aromatic hydrocarbons represented by the general formula (III) are, for example, benzyl chloride, benzyl bromide, 1-chloro-1-phenylethane, 1-chloro-1-phenylpropane, 2-chloro-2-phenylpropane and 1,2-dichloro-1-phenylethane, 2-chloro-2-phenyloctane.

The amount of the molecular weight controlling agent to be added to the polymerization system varies over a wide range depending upon the particular reaction conditions such as the kind and amount of the anionic polymerization catalyst and the solvent, the reaction temperature and the monomer concentration, and of course on the molecular weight desired in the resulting polymer. However, generally, an amount of $10^{-4}$ to 10 percent by weight, preferably $10^{-3}$ to 2 percent by weight based on the monomer is used, while the particular amount is determined in the manner which will be explained later.

The polymerization may be conducted at a temperature of 1° to 150° C., preferably 50° to 120° C. The polymerization temperature is closely related with the polymerizing velocity so that the temperature should be selected depending on the kind and amount of the polymerization catalyst in order to obtain a proper reaction velocity (hence, reaction time).

The proper reaction time is 0.5 to 8 hours, preferably 3 to 6 hours.

It is not always necessary to employ a solvent. However, in order to remove the reaction heat, it is preferable to use an inert solvent. For the same reason, it is further preferable to stir the reaction system.

In order to determine the proper amount of the molecular weight controlling agent depending upon the desired polymerization degree, we have conducted various and extensive researches and have found that, under the above described polymerization conditions, there is a relation represented by the formula:

$$\frac{1}{\bar{p}} = \alpha\frac{[C]}{[M]_p} + \beta\frac{[X]_o}{[M]_o} + \gamma\frac{[Y]}{[M]_o} \qquad (IV)$$

wherein $\bar{p}$ represents the polymerization degree of the produced polymer, [C] (mols/liter) represents the initial concentration of the catalyst, $[M]_o$ (mols/liter) represents the initial concentration of the monomer, $[X]_o$ represents the amount of the impurity contained in the monomer (mols/liter), $[M]_p$ (mols/liter) represents the amount of the polymerized monomer and the [Y] (mols/liter) is the amount of the molecular weight controlling agent.

We have also confirmed that the amount of the molecular weight controlling agent can be determined by calculation from the above formula. In the above formula, $$\beta\frac{[X]_o}{[M]_o}$$

is a value representing the influence of the impurity contained in the monomer, and $\alpha$, $\beta$ and $\gamma$ are constants determined by the particular polymerizing conditions. Thus, under predetermined particular catalyst, solvent and molecular weight controlling agent and the reaction temperature, $\alpha$, $\beta$ and $\gamma$ can be determined by experiments. For example, in case the polymerization is conducted at 100° C. by using trinormal butylamine as the catalyst and toluene as the solvent, $\alpha$ becomes 0.44, and in case the impurity is pivalic acid, $\beta$ becomes 0.85 and, in case the molecular weight controlling agent is 1,3-dichloro 1-propene, $\gamma$ becomes 0.37.

Thus, when a polymer of a desired molecular weight is to be produced, on a large scale, a value $$\beta\frac{[X]_o}{[M]_o}$$

representing the influence of the impurity contained in the monomer is determined by carrying out a polymerization test on a small scale. Then the required amount of a molecular weight controlling agent is calculated from the above indicated formula.

The molecular weight controlling agent to be used in the present invention has the following advantageous features:

1. Even if an impurity is present in the monomer, it has no influence on the molecular weight of the resulting polymer and it does not reduce the polymerization reaction velocity.
2. The above indicated formula is effective over a wide range of the amount of the molecular controlling agent and, by carrying out a polymerization test of a small scale, the proper polymerization conditions to obtain the desired molecular weight of the resulting polymer can be determined.
3. No substantial difference is seen in the molecular weight controlling effect between small scale polymerization test and the large industrial scale polymerization.
4. Since the molecular weight controlling compound is stable so that it can be used under a wide range of reaction conditions and has no adverse influence even if it is contained in the polymer.

The $\alpha,\alpha$-disubstituted-$\beta$-propiolactones to be used in the present invention are represented by the before indicated general formula (I) and are, for example, $\alpha,\alpha$-dimethyl-$\beta$-propiolactone, $\alpha$-methyl-$\alpha$-ethyl-$\beta$-propiolactone, $\alpha$-methyl-$\alpha$-propyl-$\beta$-propiolactone, $\alpha$-methyl-$\alpha$-butyl-$\beta$-propiolactone, $\alpha,\alpha$-diethyl-$\beta$-propiolactone, $\alpha$-ethyl-$\alpha$-propyl-$\beta$-propiolactone, $\alpha$-ethyl-$\alpha$-butyl-$\beta$-propiolactone, $\alpha,\alpha$-dipropyl-$\beta$-propiolactone, $\alpha,\alpha$-dipropyl-$\beta$-propiolactone, $\alpha$-propyl-$\alpha$-butyl-$\beta$-propiolactone, $\alpha,\alpha$-dibutyl-$\beta$-propiolactone, $\alpha$-methyl-$\alpha$-phenyl-$\beta$-propiolactone, $\alpha$-ethyl-$\alpha$-phenyl-$\beta$-propiolactone, $\alpha$-propyl-$\alpha$-phenyl-$\beta$-propiolactone, $\alpha$-butyl-$\alpha$-phenyl-$\beta$-propiolactone and $\alpha,\alpha$-diphenyl-$\beta$-propiolactone.

Examples of the anionic polymerization catalysts to be used are such known catalysts as tertiary amines, quaternary ammonium compounds, organic acid salts, organic metal compounds, Grignard reagents, phosphines, arsines, stibines and sulfonium compounds.

For the above mentioned tertiary amines may be used hexamethylene tetramine, trimethylamine, triethylamine, tri-n-propylamine, triisopropylamine, tri-n-butylamine, dimethylaniline, triethylene diamine and N-ethylpiperazine.

For the organic acid salts there may be used, for example, sodium salts, potassium salts and tetrabutylammonium salts of acetic acid, propionic acid, butyric acid and caproic acid.

Examples of the organic metal compounds are butyl lithium, phenyl lithium, naphthyl lithium, diethyl zinc, diethyl cadmium, tributyl boron, triethyl aluminum and triisobutyl aluminum.

For the Grignard reagents there may be used phenyl magnesium bromide and butyl magnesium iodide.

Examples of the sulfonium compounds are trimethyl sulfonium iode and triethyl sulfonium iodide.

Examples of the phosphines are used trimethyl phosphine, triethyl phosphine, tri($\beta$-chlorethyl)phosphine and triphenyl phosphine.

As for the arsines, there may be used trimethyl arsine, triethyl arsine and tripropyl arsine.

For the stibines, there may be used trimethyl stibine, triethyl stibine and tripropyl stibine.

Examples of the quaternary ammonium compound are tetralkyl ammonium salts of carboxylic acids.

Among these known catalysts, tertiary amines are the most preferable.

The anionic catalyst may be used in an amount of 0.005 to 5.0 percent by weight, preferably 0.01 to 1.0 percent by weight on the monomer.

In the following examples, all parts and percentages are by weight.

EXAMPLE 1

There were charged in a test tube 2.0 g. of pivalolactone distilled to remove organic acid, 0.866 g. of toluene distilled in the presence of metallic sodium and 37 mg. of trinormal butylamine. Then 1,3-dichloro-1-propene diluted with toluene was added thereto so that the total weight of the toluene was 1.73 g. The mixture was heated for the polymerization in a thermostatic tank at 100° C. for 6 hours. The produced solid polymer was taken out by breaking the test tube, washed with acetone and was dried, and then the molecular weight was measured. The molecular weight (M) was calculated by the formula $$[\eta] = 4.60 \times 10^{-4} M^{0.78}$$

wherein the intrinsic viscosity $[\eta]$(dl./g.) was measured in a mixed solvent at 30° C. of 6 parts by weight of phenol and 4 parts by weight of orthochlorophenol.

The intrinsic viscosity of the polymer obtained by varying the amount of 1,3-dichloro-1-propene added to the polymerization system, the reciprocal number (1/$\bar{p}$) of the polymerization degree and the time until a white turbidity was observed in the polymerization system are shown in table 1. In each case the yield of polymer was 100 percent.

TABLE 1

| No. | Amount of 1,3-dichloro-1-propene (m.mol) | Time until white turbidity was observed. | $[\eta]$ (dl./g.) | 1/$\bar{p}\times 10^3$ |
|---|---|---|---|---|

| | | | | | |
|---|---|---|---|---|---|
| 1–1 | 0 | 5 min. 15 sec. | 3.87 | | 0.93 |
| 1–2 | 0.01 | 5 min. 15 sec. | | 3.30 | 1.15 |
| 1–3 | 0.02 | 4 min. 45 sec. | | 2.95 | 1.32 |
| 1–4 | 0.03 | 4 min. 30 sec. | | 2.68 | 1.49 |
| 1–5 | 0.04 | 4 min. 15 sec. | | 2.46 | 1.67 |
| 1–6 | 0.4 | 3 min. 45 sec. | | 0.70 | 8.32 |

As evident also from the results shown in table 1, 1,3-dichloro-1-propene influences the molecular weight without retarding the polymerization of pivalolactone.

Thus, the time (induction period) until a white turbidity indicating the beginning of the polymerization tends to become somewhat shorter due to the addition of 1,3-dichloropropene, but the progress of the polymerization is not retarded in contrast with those cases where known conventional molecular weight controlling agents are used.

When the amounts of 1,3-dichloro-1-propene and the corresponding reciprocal numbers ($1/\bar{p}$) of the polymerization degree are plotted, a straight line is obtained. If this straight line is applied to the formula (IV), there are obtained the values $$\alpha \frac{[C]_0}{[M]_p} + \beta \frac{[X]_0}{[M]_0} = 0.93 \times 10^{-3} \text{ and } \gamma = 0.37$$

It is one of the important features of the method of the present invention that there is a linear relationship between $1/\bar{p}$ and the amount of addition over a wide range of the amounts of addition of the molecular weight controlling agent.

When another series of experiments were conducted by varying only the amount of trinormal butylamine (catalyst) without using the molecular weight controlling agent, the value of $\alpha$ was 0.44. Calculating from this value, $$\beta \frac{[X]_0}{[M]_0} = 0.49 \times 10^{-3}$$

Therefore, in order to obtain a polypivalolactone of $[\eta]=2.80$ ($1/\bar{p} \approx 1.41 \times 10^{-3}$), it is determined from the relation of the formula (IV) that 0.026 m.mol of 1,3-dichloro-1-propene should be added. In fact, when 0.026 m.mol of 1,3-dichloro-1-propene was added to the polymerization system, there was obtained polypivalolactone having an intrinsic viscosity of 2.82 which is very close to the value (2.80) calculated above.

Thus, when the value of $$\beta \frac{[X]_0}{[M]}$$

is determined by determined by a preliminary polymerizing test in advance, even if a monomer containing an impurity is used the amount of the molecular weight controlling agent for obtaining the desired molecular weight at a desired polymerization velocity (determined by the amount of the catalyst) can be easily calculated with the formula (IV).

EXAMPLE 2

The experiment of example 1 was conducted on a larger scale. In order to obtain a polypivalolactone of an intrinsic viscosity of 3.00 ($1/\bar{p}=1.29 \times 10^{-3}$) by using a pivalolactone showing an intrinsic viscosity of 5.75 ($1/\bar{p}=0.56 \times 10^{-3}$) in a preliminary polymerization test; when calculated by the method in example 1, in case 1,3-dichloro-1-propene ($\gamma=0.37$) is used as a molecular weight controlling agent, 1.97 m.mol of the latter per mol of the pivalolactone should be added to the polymerization system.

Thus 15 kg. (150 mol) of the pivalolactone and 13 kg. of toluene were mixed together in a stainless steel reaction vessel fitted with a stirrer and reflux condenser. Then 27.8 g. of trinormal butylamine and 32.8 g. (0.296 mol) of 1,3-dichloro-1-propene were added thereto and the polymerization was carried out at 100° C. for 6 hours with stirring. The obtained powdery polymer was dried and the intrinsic viscosity was measured by the method explained in example 1. The intrinsic viscosity was 3.03.

It will be appreciated, therefore, that in order to obtain a polypivalolactone having a desired molecular weight, a polymerization test with a small amount of the monomer may be conducted to determine the proper amount of the molecular weight controlling agent to be used in the polymerization on a large or industrial scale.

EXAMPLE 3

There were mixed in a test tube 2.0 g. of pivalolactone distilled to remove organic acid and 1.98 mg. of N-methylpiperidine distilled for purification in the presence of metallic sodium and diluted with toluene. Then molecular weight adjusting agent 1,3-dichloro-1-propene diluted with toluene was added thereto to make the total weight of the toluene 1.73 g. The polymerization reaction was carried out in a thermostatic tank kept at a reaction temperature of 75° C. for 6 hours. By the same operation as in example 1, the intrinsic viscosity of the resulting polymer was measured and the reciprocal number ($1/\bar{p}$) of the polymerization degree was determined.

The intrinsic viscosity $[\eta]$, the reciprocal number ($1/\bar{p}$) of the polymerization degree and the time until the white turbidity of the polymerization system was observed were as shown in table 3. The yield of the polymer was 100 percent in each case.

TABLE 3

| Experiment No. | Amount of 1,3-dichloro-1-propene (mg.) | Time until white turbidity was observed | Intrinsic viscosity $[\eta]$ | Reciprocal number $(1/\bar{p})$ $1/\bar{p} \times 10^3$ |
|---|---|---|---|---|
| 3–1 | 0 | 3 min., 30 sec. | 2.24 | 1.88 |
| 3–2 | 2.2 | 3 min., 30 sec. | 1.86 | 2.38 |
| 3–3 | 4.4 | 3 min., 30 sec. | 1.61 | 2.85 |
| 3–4 | 11.0 | 3 min., 30 sec. | 1.26 | 3.93 |
| 3–5 | 22.0 | 3 min., 30 sec. | 0.93 | 5.85 |

There was a linear relation between the reciprocal numbers of the polymerization degree and the amounts of 1,3-dichloro-1-propene, and $\gamma$ was 0.40. From this relation it is calculated that, in order to obtain a polypivalolactone of an intrinsic viscosity of 1.50 ($1/\bar{p}=3.13 \times 10^{-3}$) by using this monomer, 2.975 m.mol (6.6 mg.) of 1,3-dichloro-1-propene should be added per mol of the monomer.

Thus the polymerization was conducted under the same conditions as are mentioned above except that 6.6 mg. of 1,3-dichloro-1-propene were used. The intrinsic viscosity of the resulting polymer was 1.47 which was very close to the desired value (1.50).

Thus, a polymer having a desired molecular weight can be easily and accurately produced without noticeably influencing the velocity of the polymerization reaction.

EXAMPLE 4

A series of polymerization reactions were conducted under the same conditions as in example 1 except that various other molecular weight controlling agents shown in table 4 were used.

In the table, $[\psi]$obs. represents the measured intrinsic viscosity of the resulting polymer and $[\psi]$calc. represents the value of an intrinsic viscosity calculated from $$\alpha, \beta \frac{[X]_0}{[M]_0}$$

and $\gamma$ determined by a preliminary polymerization test.

TABLE 4

| Experiment No. | Molecular weight controlling agent | Amount of molecular weight controlling agent | $[\psi]$obs. | $[\psi]$calc. |
| --- | --- | --- | --- | --- |
| 4–1 | None | | 7.20 | |
| 4–2 | 3-bromo-1-propene | 7.2 mg. | 3.10 | 3.10 |
| 4–3 | 3-iodo-1-propene | 10.7 mg. | 3.05 | 3.01 |
| 4–4 | 1-chloro-2-butene | 4.35 mg. | 3.22 | 3.28 |
| 4–5 | 1,3-dichloro-2-butene | 6.0 mg. | 3.35 | 3.41 |
| 4–6 | 3-chloro-2-methyl-1-propene | 4.4 mg. | 3.04 | 3.05 |
| 4–7 | Benzyl chloride | 6.1 mg. | 2.80 | 2.72 |
| 4–8 | 1-chloro-2-hexene | 4.4 mg. | 3.52 | 3.50 |
| 4–9 | 1,2-dichloro-1-phenylethane | 7.05 mg. | 3.30 | 3.33 |

From the results in table 4, it will be apparent that these compounds of the present invention are useful as molecular weight controlling agents.

EXAMPLE 5

The same procedure as in example 1 was repeated except that various other molecular weight controlling agents were employed and that $\alpha,\alpha$-diethyl-$\beta$-propiolactone was used as a monomer. The results are shown in table 5.

TABLE 5

| Experiment No. | Molecular weight controlling agent | Amount of molecular weight controlling agent | $[\psi]$obs. | $[\psi]$calc. |
| --- | --- | --- | --- | --- |
| 5–1 | None | | 4.15 | |
| 5–2 | 1,3-dichloro-2-methyl-1-propene | 3.0 mg. | 3.00 | 3.02 |
| 5–3 | 1,3-dibromo-2-methyl-1-propene | 5.15 mg. | 3.20 | 3.13 |
| 5–4 | 3-chloro-2-chloro-methyl-1-propene | 3.4 mg. | 2.89 | 2.88 |
| 5–5 | Benzyl bromide | 4.1 mg. | 3.11 | 3.00 |
| 5–6 | 1-chloro-2-octene | 5.7 mg. | 3.45 | 3.40 |
| 5–7 | 2-chloro-2-phenyl-octane | 9.4 mg. | 3.26 | 3.30 |

EXAMPLE 6

There were mixed together in a test tube 2.0 g. of purified pivalolactone and 4.28 mg. of tetra-n-butylammonium laurate diluted with toluene distilled for purification in the presence of metallic sodium. Then 1,3-dichloro-1-propene diluted with toluene was further added thereto so that the total weight of the toluene became 1.73 g. The polymerization reaction was conducted in a thermostatic tank at a temperature of 75° C. for 6 hours. The reciprocal number $(1/\bar{p})$ of the polymerization degree was determined by measuring the intrinsic viscosity $[\psi]$ of the polymer in the same manner as in example 1. The results are shown in table 6.

The white turbidity of the polymerization system was observed with the beginning of each reaction irrespective of the amount of the molecular weight controlling agent. The yield of the polymer as 100 percent in each case.

TABLE 6

| Experiment No. | Amount of 1,3-dichloro-1-propene | Intrinsic viscosity $[\psi]$ | Reciprocal number $(1/\bar{p} \times 10^3)$ |
| --- | --- | --- | --- |
| 6–1 | 0 | 4.15 | 0.85 |
| 6–2 | 2.2 mg. | 3.28 | 1.15 |
| 6–3 | 4.4 mg. | 2.73 | 1.45 |
| 6–4 | 11.0 mg. | 1.88 | 2.35 |
| 6–5 | 22.0 mg. | 1.29 | 3.80 |

There is a linear relationship between the reciprocal numbers of the polymerization degrees and the amounts of 1,3-dichloro-1-propene. From this relation, it is calculated that, in order to obtain a polypivalolactone of an intrinsic viscosity of 3.00 ($1/\bar{p}$=1.29 ×10⁻³) by using this monomer, 1.47 m.mols of 1,3-dichloro-1-propene should be added per mol of the monomer.

The intrinsic viscosity of the polymer obtained under the same conditions except that 3.23 mg. of 1,3-dichloro-1-propene were added was 3.05 and well coincided with the desired value.

What we claim is:

1. A process for producing a poly $\alpha,\alpha$-disubstituted -$\beta$-propiolactone by the ring-opening polymerization of an $\alpha,\alpha$-disubstituted -$\beta$-propiolactone of the general formula:

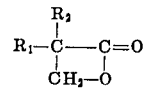

wherein each of $R_1$ and $R_2$ represents an alkyl group having one to four carbon atoms or aryl group in the presence of an anionic catalyst, characterized in that the polymerization is conducted in the presence of a molecular weight controlling agent selected from the group consisting of halogenated unsaturated hydrocarbons represented by the general formula:

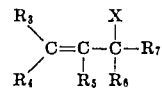

wherein each of $R_3$, $R_4$, $R_5$, $R_6$ and $R_7$ represents hydrogen, halogen atom, alkyl group having one to six carbon atoms, aryl group, halogenated alkyl group having one to six carbon atoms and X represents a halogen atom; and halogenated aromatic hydrocarbons represented by the general formula:

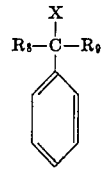

wherein X represents a halogen atom and each $R_8$ and $R_9$ represents hydrogen, halogen atom, alkyl group having one to six carbon atom, or a halogenated alkyl group having one to six carbon 2. A process as claimed in claim 1 wherein the molecular weight controlling agent is employed in an amount of 10⁻⁴ to 10 percent by weight based on the monomer.

3. A process as claimed in claim 2 wherein the amount of the molecular weight controlling agent is determined by the formula $$\frac{1}{\bar{p}} = \alpha \frac{[C]}{[M]_p} + \beta \frac{[X]_0}{[M]_0} + \gamma \frac{[Y]}{[M]_0}$$

wherein $\bar{p}$ represents the polymerization degree of the polymer produced, [C] (mols/liter) represents the initial concentration of the catalyst, $[M]_0$ (mols/liter) represents the initial concentration of the monomer, $[X]_0$ (mols/liter) represents the amount of the impurity contained in the monomer, $[M]_p$ (mols/liter) represents the amount of the polymerized monomer and [Y] (mols/liter) represents the amount of the molecular weight controlling agent, $\alpha, \beta$ and $\gamma$ are constants determined by the particular polymerization conditions.

4. A process as claimed in claim 1 wherein the halogenated unsaturated hydrocarbons are 3-chloro-1-propene, 3-bromo-1-propene, 3-iodo-1-propene, 3-fluoro-1-propene, 1,3- dichloro-1-propene, 2,3-dibromo-1-propene, 1,2,3-trichloro-1-propene, 3-chloro-2-methyl-1-propene, 1,3-dichloro-2-methyl-1-propene, 1,3-dibromo-2-methyl-1-propene, 3-chloro-2-chloro-methyl-1-propene, 1-bromo-2-butene, 1-chloro-2-butene, 1,3-dichloro-2-butene, 1,3-dichloro-2-methyl-1-propene, 1,1,3-trichloro-2-methyl-1-propene, 1,3,3-trichloro-2-methyl-1-propene, 1,3-dichloro-2-chloromethyl-1-propene, 3,3,3-trichloro-2-methyl-1-propene, 3,3-dichloro-2-chloromethyl-1-propene, 1-chloro-3-methyl-2-butene, 1-chloro-2,3-dimethyl-2-butene, 1-chloro-3-phenyl-2-propene, 1-chloro-2-hexane and 1-chloro-2-octene.

5. A process as claimed in claim 1 wherein the halogenated aromatic hydrocarbons are benzyl chloride, benzyl bromide, 1-chloro-1-phenylethane, 1-chloro-1-phenylpropane, 2-chloro-2-phenylpropane and 1,2-dichloro-1-phenylethane, 2-chloro-2-phenyloctane.

\* \* \* \* \*